United States Patent [19]

Retallick

[11] 4,246,751
[45] Jan. 27, 1981

[54] THRUST ENGINE AND PROPELLANT EXHAUST ARRANGEMENT THEREFOR

[75] Inventor: Francis D. Retallick, Bethel Park, Pa.

[73] Assignee: Westinghouse Electric Corporation, Pittsburgh, Pa.

[21] Appl. No.: 272,726

[22] Filed: Apr. 12, 1963

[51] Int. Cl.² ............................................. G21D 5/02
[52] U.S. Cl. ................................. 60/203; 176/DIG. 3
[58] Field of Search ..................... 60/35.5, 35.6, 203; 102/49, 34.5, 49.3; 176/DIG. 3

[56] References Cited

U.S. PATENT DOCUMENTS

| 2,894,891 | 7/1959 | Grebe | 60/35.5 |
| 3,138,919 | 6/1964 | Deutsch | 60/35.6 |

FOREIGN PATENT DOCUMENTS 602941  8/1960  Canada ................................... 176/MR Primary Examiner—Stephen C. Bentley
Attorney, Agent, or Firm—Z. L. Dermer; E. L. Levine

EXEMPLARY CLAIM

1. A nuclear engine and nozzle arrangement for a nuclear rocket, said arrangement comprising a cluster of elongated fissile fuel bearing and high temperature capacity modules suitably supported in a pressure vessel, said modules each having a plurality of coolant-propellant channels extending therethrough, a convergent-divergent nozzle structure of fixed cross-sectional dimensions secured to the end portion of each of said modules said modules, a divergent-only unitary skirt member connected directly to the propellant exit end of said modular cluster in series with and diverging from the divergent ends of said convergent-divergent nozzle structures, said modules being formed to conduct a compressible propellant therethrough at sub-sonic velocities, said nozzle structures being formed to develop supersonic velocities of the propellant and said divergent-only skirt being formed to develop further the supersonic velocities of said propellant.

5 Claims, 8 Drawing Figures

THRUST ENGINE AND PROPELLANT EXHAUST ARRANGEMENT THEREFOR

The present invention relates to thrust engines and propellant exhaust arrangements therefor and more particularly to such systems which utilize a nuclear reactor as a power source and which further utilizes a portion of the reactor assembly itself in nozzling the exhausting propellant for desired or specified thrust.

A nuclear thrust or rocket device engine as described herein is one in which energy generated by a controlled chain nuclear reaction is transferred to a propellant which then develops device accelerating thrust when it is exhausted from the rocket device. The chain nuclear reaction is propagated by means of fissile material normally interstitially distributed in a modular structure, with the amount and geometric distribution of the fissile material and other factors providing critical reactivity conditions. Further, the modular structure can be elongated with longitudinal openings for flow of the propellant therethrough and consequent energization of the propellant by transfer of fission generated heat thereto.

The propellant is then exhausted from the device and in order to obtain maximum specific impulse or thrust per pound of propellant it is necessary that the propellant be in the form of a gas having the minimum possible molecular or atomic weight. For this reason, hydrogen has been used as the propellant in early ground test nuclear engines and will be used in the first flight nuclear engines now undergoing final development. It is noted, however, that other gases can be used as a nuclear engine propellant if the advantages associated with such use outweigh the disadvantages of lower specific thrust.

During exhaust of the propellant, the acquired heat energy is transformed into velocity energy by means of pressure induced acceleration of the propellant particles along the exhaust flow path. According to applicable flow phenomena, at subsonic velocity (compressible) gas particle acceleration is obtained by a converging exhaust flow path whereas, at supersonic velocity, (compressible) gas particle acceleration is obtained by a diverging exhaust flow path. Therefore, where supersonic propellant exit velocity is desired or necessary, a convergent-divergent flow exhaust path is required for the propellant from the reactor engine to the propellant exit area. On this basis, a so-called convergent-divergent nozzle is well known for use in providing this required exhaust path for the total propellant flow.

One limiting factor, however, is that nuclear or other thrust engines are normally designed to operate at extremely high temperatures for efficiency reasons, for example the propellant as it departs from the engine reactivity region in a nuclear thrust engine can have a temperature of 4000° F. or more. This factor, coupled with the fact that the hydrogen or other propellant can be or is characterized with a very high convective heat transfer coefficient as determined by the propellant velocity and pressure, can and normally does lead to problems in heat dissipation along the exhaust flow path. The heat dissipation problem is particularly acute adjacent the throat section of a convergent-divergent nozzle where the hydrogen or other propellant acquires velocity and pressure parameters which cooperatively effect a relative maximum amount of convective heat transfer from the propellant. The resultant temperature rise of the surrounding nozzle throat section which accepts such heat transfer leads to the necessity of using structure and materials in a manner that enables both required heat dissipation and specified mechanical nozzle strength to be obtained.

One manner in which the exhaust system can be engineered to resolve the problem is to provide a single convergent-divergent nozzle for directing the entire propellant flow and further to utilize materials of suitable heat capacity in a throat section structure which meets both heat dissipation and strength specifications. An example of such structure is disclosed in a copending application entitled Thermal Barrier for Thrust Vehicle Nozzle and Method of Making Same filed by D. Thomas on August 17, 1962, Ser. No. 217,698, and assigned to the present assignee.

There are, however, applications where structural materials are not available for specified temperature and heat conditions or where it is more advantageous to avoid the nozzle throat structure problem altogether if the avoidance does not produce unacceptable penalties in other respects. Thus, according to the broad principles of the present invention, a nuclear or other engine is provided with a plurality of elongated nuclear fuel bearing or other heat generating modules assembled together to form an elongated propellant energizing or heating region. The propellant exit of preferably all of the fueled or other modules is provided with a convergent-divergent nozzle structure so that velocity development in the total propellant flow is accomplished over parallel flow paths rather than over a single main flow path. In this manner, the overall exhaust nozzle flow path is shortened and convective transfer of heat from the propellant is accepted by a nozzle structure which can be made of the same temperature bearing base material of the engine modules and the problem of dissipating heat in the nozzle throat sections is substantially eliminated while structural integrity of the modules does not become problematical. Further, if additional velocity development is desired beyond that obtainable over the modular nozzle flow paths, a unitary divergent skirt can be provided on the engine so as to extend outwardly from the propellant modular exit area and thereby serve as a single total propellant flow path for the added propellant velocity development.

It is therefore an object of the invention to provide a novel nuclear or other rocket engine and propellant exhaust system therefor wherein propellant nozzling is accomplished with improved heat transfer efficiency.

It is a further object of the invention to provide a novel nuclear rocket engine and propellant exhaust system therefor wherein propellant exhaust flow is accomplished at least partly through parallel nozzle paths so as to provide improved heat transfer efficiency.

An additional object of the invention is to provide a novel nuclear or other rocket engine and propellant exhaust system therefor wherein exhaust nozzle structure is comparatively shortened.

A further object of the invention is to provide a novel nuclear rocket engine and propellant exhaust system therefor wherein the engine comprises a modular fissile fuel bearing arrangement and the propellant exhaust system includes nozzle exhaust structure provided adjacent the propellant exit end of each module in the engine arrangement so as to provide improved heat transfer efficiency and so as to enable the nozzle structure to be shortened comparatively.

Another object of the invention is to provide a novel nuclear or other rocket engine and propellant exhaust system therefor wherein improved heat transfer efficiency is obtained through employment of a main divergent nozzle to which propellant is directed at supersonic velocity by other convergent-divergent nozzle means.

These and other objects of the invention will become more apparent upon consideration of the following detailed description taken in conjunction with the attached drawings, in which.

Figure 5:
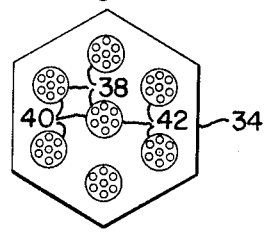
Figure 7:
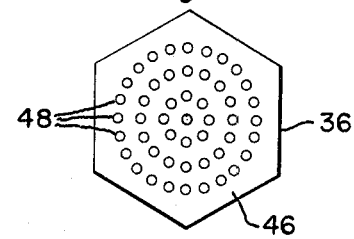
Figure 6:
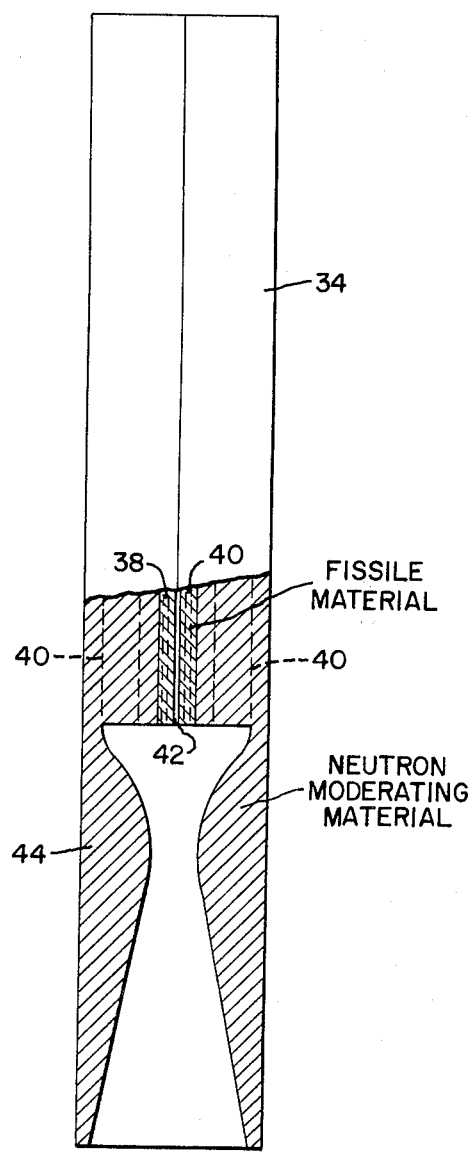
Figure 8:
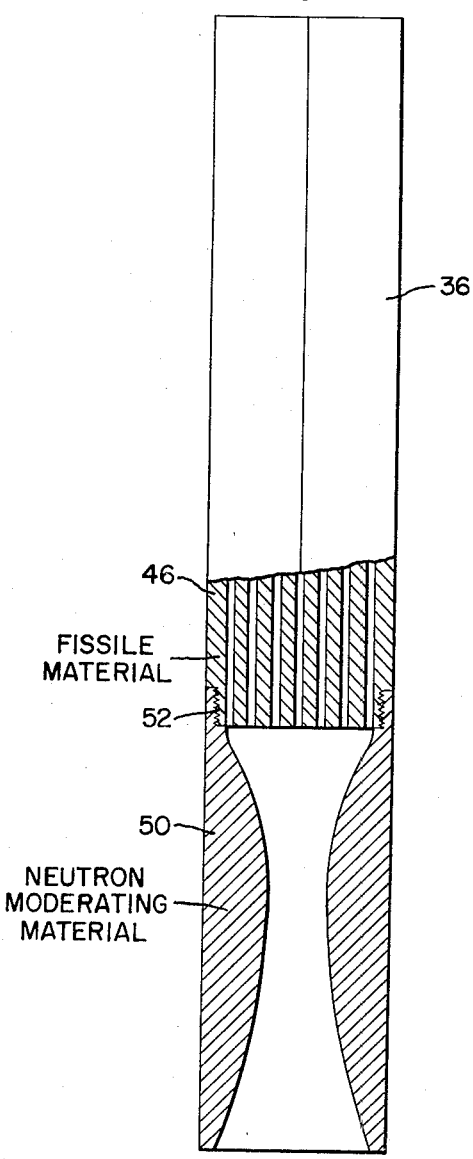

FIGS. 5 and 6 show top plan and partially sectioned elevational views, respectively, of one type engine module and individual nozzle structure therefor constructed in accordance with the principles of the invention; and FIGS. 7 and 8 show top plan and partially sectioned elevational views of another type engine module and individual nozzle structure therefor constructed in accordance with the principles of the invention.

Figure 3:
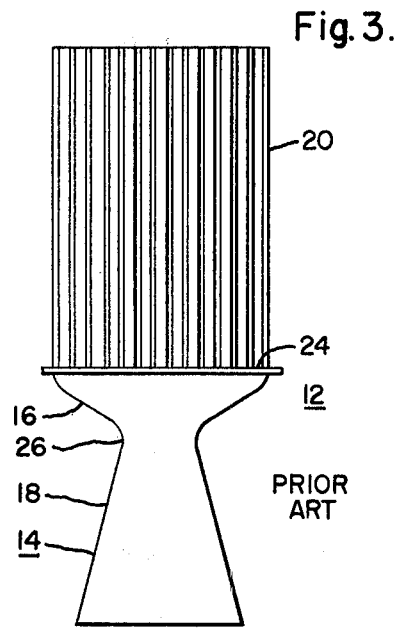
FIG. 3 is an elevational view of a modular reactive region of a nuclear engine and prior art exhaust nozzle structure therefor.
Figure 4:
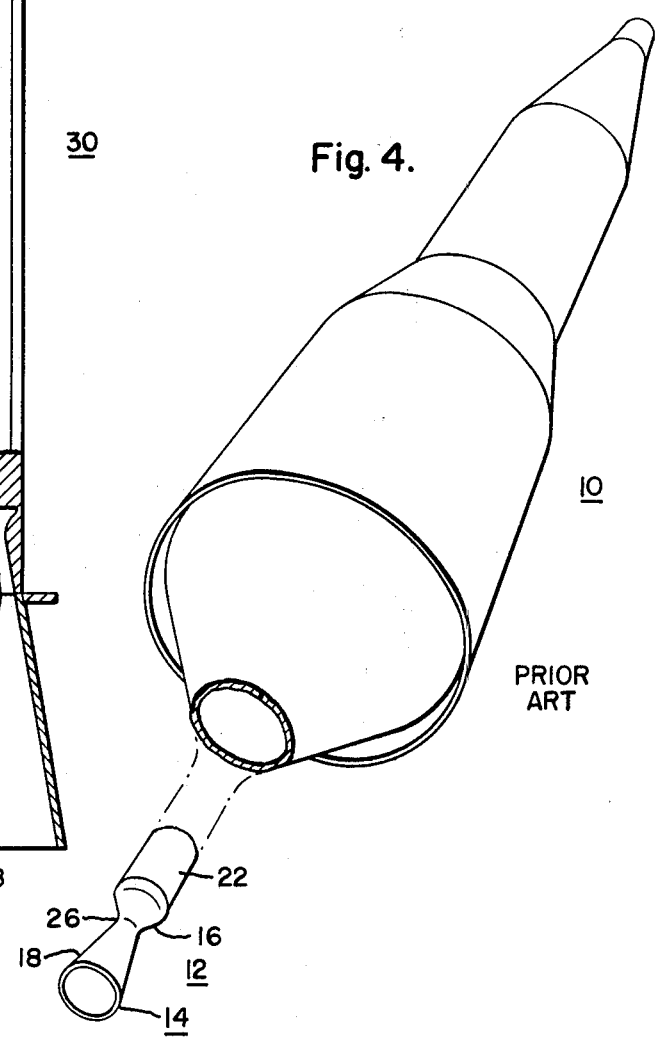
FIG. 4 is a perspective view of a nuclear rocket and prior art engine and exhaust nozzle arrangement therefor.

More specifically, in FIG. 4 there is shown a nuclear rocket 10 having a prior art hydrogen propellant nuclear engine and exhaust nozzle arrangement 12 (see also FIG. 3). For reasons previously indicated, nozzle 14 of the arrangement 12 is of the convergent-divergent type as indicated by reference characters 16 and 18, respectively. The engine and nozzle arrangement 12 is also provided with a plurality of elongated propellant energizing or fissile fuel bearing modules arranged in a cluster so as to form a nuclear reactive region 20 which generates heat energy for transfer to the employed propellant such as hydrogen. The modules are each normally formed from a high temperature capacity and neutron moderating material such as graphite, a carbide or a refractory metal with fissile fuel such as enriched uranium disposed therein and with coolant-propellant channels provided longitudinally therethrough. Further, the modules are interfitted and supported in cluster form by any suitable means such as a barrle or hung from or supported on a plate like structure (not shown). The latter support means or barrel can then be supported relative to a pressure vessel 22 (FIG. 4).

The exhaust nozzle 14 is supported adjacent propellant exit ends 24 of the clustered modules or reactive region 20 so that the total propellant flow is directed therethrough. Thus, as already considered, nozzle throat section 26 is subjected to extremely high temperature conditions which lead to material and heat removal problems which in some applications are irresolvable or solvable only through undesired and sometimes unreliable complexity and great exposure.

Figure 2:
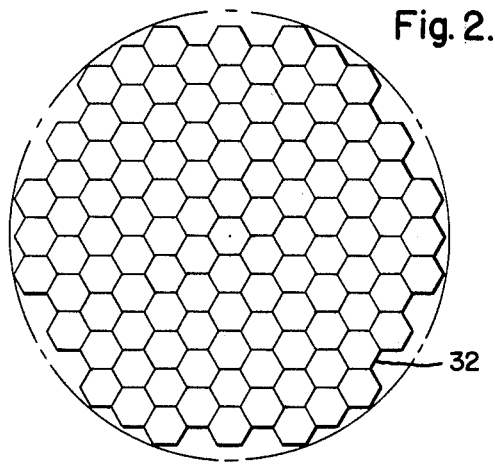
FIG. 2 is a top plan view, with portions omitted for simplicity, of the modular reactive region of the nuclear engine shown in FIG. 1.
Figure 1:
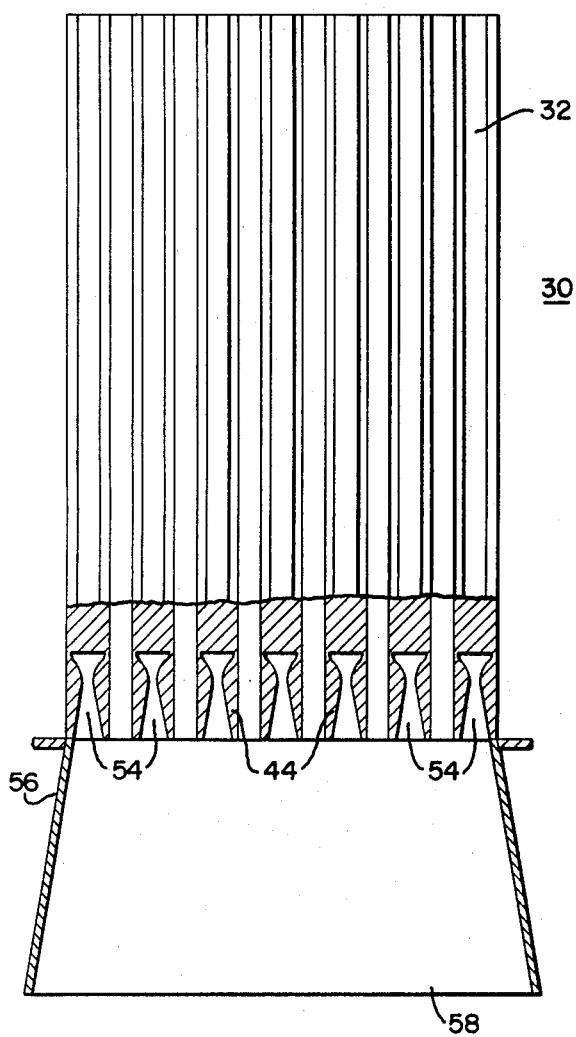
FIG. 1 shows a vertical section of a modular reactive region of a nuclear engine and nozzle structure therefor constructed in accordance with the principles of the invention.

In FIGS. 1 and 2 there is shown a nuclear engine and nozzle arrangement 30 constructed in accordance with the principles of the invention so as to avoid the difficulties associated with known prior art structure. The arrangement 30 comprises a cluster 32 (reactive region) of supported fissile fuel bearing and elongated modules 34 (FIG. 6) or 36 (FIG. 8). The base material of the modules 34 and 36 is preferably selected from the group of materials already discussed in connection with FIG. 3, and similarly a fissile fuel such as enriched uranium can be disposed therein.

Thus, the elongated module 34 can be formed from graphite or other high temperature capacity and neutron moderating material and is provided with a plurality of longitudinally extending channels 38. Fissile fuel is disposed in the modules 34 by means of respective elongated fuel rods 40 supported in the module channels 38. Each fuel rod 40 is also provided with longitudinally extending channels 42 through which coolant-propellant such as hydrogen flows longitudinally for heating therefor and subsequent discharge from the engine and nozzle arrangement 30. Further, each fuel rod 40 can be formed from the group of materials already discussed in connection with FIG. 3 containing a fissile material such as enriched uranium. In this case, a convergent-divergent nozzle structure 44 is formed integrally with the propellant exit end of the module 34 and as such accepts and channels outwardly the heated propellant discharged thereto from the fuel rod channels 42. As noted previously, the purpose of the nozzle structure 44 is to develop supersonic velocity in the outgoing propellant.

The elongated module 36 (FIGS. 7 and 8) is similar to the module 34 except that the base material (such as graphite) of module body 46 has incorporated interstitially therein fissile fuel such as enriched uranium and further is provided with longitudinally extending coolant-propellant channels 48. In this case, a nozzle structure 50 is also disposed adjacent the propellant exit end of the module 36 but is a separate element preferably of the same material as the unfueled base material of the module body 46 secured to the latter by suitable fastener means such as thread means 52. Through such use of non-fueled structural material, nuclear reactivity is avoided in the nozzle structure 36.

When the modules 34 or the modules 36 are respectively clustered together to form the reactivity region 32, the individual nozzle structures 44 or 50 are also clustered together (see, for example the nozzle structures 44 in FIG. 1) so as to provide a plurality of velocity development flow paths 54 for the propellant or hydrogen as it is exhausted from the modules 34 or 36. Although the propellant in the individual flow streams will have thus acquired supersonic velocity, it can often be desirable to develop additional propellant velocity without lengthening the individual module nozzle structure 44 or 50. Thus, in nuclear or other rockets, a single diverging nozzle or skirt 56 can be secured in place by suitable means adjacent the exit ends of the nozzle structures 44 or 50. The skirt 56 then accepts the total propellant for further velocity development and finally for thrust producing discharge through skirt open end 58.

The foregoing description has been set forth only for the purpose of illustrating the invention. Accordingly, it is desired that the invention be not limited by the embodiments described, but, rather, that be accorded an interpretation consistent with the spirit and scope of its broad principles.

What is claimed is:

1. A nuclear engine and nozzle arrangement for a nuclear rocket, said arrangement comprising a cluster of elongated fissile fuel bearing and high temperature capacity modules suitably supported in a pressure vessel, said modules each having a plurality of coolant-propellant channels extending therethrough, a convergent-divergent nozzle structure of fixed cross-sectional dimension secured to the end portion of each of said modules said modules, a divergent-only unitary skirt member connected directly to the propellant exit end of said modular cluster in series with and diverging from the divergent ends of said convergent-divergent nozzle structures, said modules being formed to conduct a compressible propellant therethrough at sub-sonic velocities, said nozzle structures being formed to develop supersonic velocities of the propellant and said divergent-only skirt being formed to develop further the supersonic velocities of said propellant.

2. A nuclear engine and nozzle arrangement for a nuclear rocket, said arrangement comprising a cluster of elongated fissile fuel bearing and high temperature capacity modules suitably supported in a pressure vessel, said modules each having a plurality of coolant-propellant channels extending therethrough, a convergent-divergent nozzle structure of fixed cross-sectional dimensions secured to the discharge end portion of each of said modules for supersonic velocity development of the propellant as it flows at sub-sonic velocities from the module channels and then through the nozzle structures for discharge from each of the modules, and a divergent-only unitary skirt member secured directly to the propellant exit end of said modular cluster in series with and diverging from the divergent ends of said convergent-divergent nozzle structures to provide further velocity development for the propellant as it flows from the individual module nozzle structures to the exterior.

3. A nuclear engine and nozzle arrangement for a nuclear rocket as set forth in claim 2, wherein each of said modules is provided with a plurality of coolant-propellant channels in each of which a fuel bearing rod is supported, said channels extend longitudinally through each of said fuel rods, and the nozzle structure of each of said modules is integral therewith.

4. A nuclear engine and nozzle arrangement for a nuclear rocket as set forth in claim 2, wherein a body member of each of said modules has fissile fuel material incorporated interstitially therein and said coolant-propellant channels extend longitudinally through said body member, and the nozzle structure of each of said modules is a separate high temperature capacity element secured to the exit end of the respective body members by suitable means.

5. An engine and nozzle arrangement for a rocket, said arrangement comprising a suitably supported cluster of elongated and generally parallel propellant heating and high temperature capacity modules, a convergent-divergent nozzle structure of fixed cross-sectional dimensions secured to the end portion of each of said modules for supersonic velocity development of the propellant as it flows from the modules, and a main divergent-only nozzle member secured directly to the propellant exit end of said modular cluster to provide further velocity development for the propellant as it flows from the individual module nozzle structures to the exterior.

* * * * *